US009448901B1

(12) United States Patent
Aslam et al.

(10) Patent No.: US 9,448,901 B1
(45) Date of Patent: Sep. 20, 2016

(54) REMOTE DIRECT MEMORY ACCESS FOR HIGH AVAILABILITY NODES USING A COHERENT ACCELERATOR PROCESSOR INTERFACE

(71) Applicant: International Business Machines Corporation, Armonk, NY (US)

(72) Inventors: Muhammad Sohaib Aslam, Ajax (CA); Tiia J. Salo, Cary, NC (US); Ao Wan, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/969,752

(22) Filed: Dec. 15, 2015

(51) Int. Cl.
*G06F 11/00* (2006.01)
*G06F 11/20* (2006.01)
*G06F 15/173* (2006.01)

(52) U.S. Cl.
CPC ..... *G06F 11/2094* (2013.01); *G06F 15/17331* (2013.01); *G06F 2201/805* (2013.01)

(58) Field of Classification Search
CPC ............... G06F 11/2094; G06F 15/17331; G06F 2201/805
See application file for complete search history.

(56) References Cited

U.S. PATENT DOCUMENTS

| 7,843,907 | B1 | 11/2010 | Abou-Emara et al. |
| 7,953,085 | B2 | 5/2011 | Chang et al. |
| 8,023,417 | B2 | 9/2011 | Blackmore et al. |
| 8,954,785 | B2 | 2/2015 | Fox et al. |
| 9,229,901 | B1* | 1/2016 | Nesbit ............... G06F 15/17331 |
| 2005/0216552 | A1* | 9/2005 | Fineberg ............ G06F 12/0284 709/203 |
| 2009/0164749 | A1* | 6/2009 | England .................. G06F 9/545 711/206 |
| 2012/0221803 | A1* | 8/2012 | Stabrawa ............. G06F 3/0611 711/154 |
| 2014/0047263 | A1* | 2/2014 | Coatney ............. G06F 11/2023 714/4.11 |
| 2014/0143364 | A1* | 5/2014 | Guerin ............. G06F 15/17331 709/212 |
| 2014/0244578 | A1* | 8/2014 | Winkelstraeter .... G06F 11/1435 707/617 |
| 2014/0365816 | A1 | 12/2014 | Antony |
| 2015/0121134 | A1* | 4/2015 | Wipfel ................ G06F 11/2094 714/6.31 |
| 2015/0227325 | A1* | 8/2015 | Rupanagunta ........ G06F 3/0613 710/16 |
| 2015/0331722 | A1* | 11/2015 | Magro ................ G06F 9/45533 718/1 |
| 2016/0062944 | A1* | 3/2016 | Xiong ..................... H04L 51/18 709/212 |
| 2016/0085647 | A1* | 3/2016 | Ramasubramaniam G06F 11/2033 714/4.12 |
| 2016/0103744 | A1* | 4/2016 | Antony ................. G06F 3/065 714/4.12 |

OTHER PUBLICATIONS

Mell et al., "The NIST Definition of Cloud Computing," National Institute of Standards and Technology, Sep. 2011, p. 1-3, Special Publication 800-145.

* cited by examiner

*Primary Examiner* — Marc Duncan
(74) *Attorney, Agent, or Firm* — Robert C. Bunker; Steven C. Kurlowecz; Anthony V. S. England

(57) ABSTRACT

According to one exemplary embodiment, a method for remote direct memory access failover is provided. The method may include determining an RDMA operation will be performed. The method may include determining an available node. The method may include sending a data element to the available node based on the RDMA operation being an insert. The method may include receiving a pointer in response to sending the insert, whereby the pointer corresponds to a memory range. The method may include storing the pointer. The method may include retrieving the pointer based on the RDMA operation being an update, a read, or a delete. The method may include sending the pointer, the data element to the available node based on the RDMA operation being an update. The method may include sending the pointer and the RDMA operation to the available node based on the RDMA operation being a read or a delete.

19 Claims, 10 Drawing Sheets

REMOTE DIRECT MEMORY ACCESS FOR HIGH AVAILABILITY NODES USING A COHERENT ACCELERATOR PROCESSOR INTERFACE

BACKGROUND

The present invention relates generally to the field of computing, and more particularly to remote direct memory access.

High Availability (HA) is an important consideration in Cloud data centers. HA allows for applications to have the availability needed, independent of the operating system and application, by providing failover protection against hardware and operating system outages within a cloud information technology (IT) environment.

SUMMARY

According to one exemplary embodiment, a method for remote direct memory access (RDMA) failover is provided. The method may include determining an RDMA operation will be performed, whereby the RDMA operation is one of an update operation, an insert operation, a read operation, or a delete operation. The method may also include determining an available node based on determine that the RDMA operation will be performed, whereby the available node is a primary node or a secondary node. The method may then include sending the determined RDMA operation and a data element to the determined available node based on the determined RDMA operation being the insert operation. The method may further include receiving a remote pointer in response to sending the insert operation, whereby the remote pointer corresponds to a memory range mapped between the primary node and the secondary node. The method may also include storing the received remote pointer. The method may then include retrieving the stored remote pointer based on the determined RDMA operation being the update operation, the read operation, or the delete operation. The method may further include sending the stored remote pointer, the data element, and the update operation to the available node based on the determined RDMA operation being the update operation. The method may also include sending the stored remote pointer and the determined RDMA operation to the available node based on the determined RDMA operation being the read operation or the delete operation, whereby the available node performs the sent RDMA operation, and whereby the available node forwards the sent RDMA operation to the secondary node if the available node is the primary node and the sent RDMA operation is the insert operation, the update operation, or the delete operation.

According to another exemplary embodiment, a computer system for remote direct memory access (RDMA) failover is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include determining an RDMA operation will be performed, whereby the RDMA operation is one of an update operation, an insert operation, a read operation or a delete operation. The method may also include determining an available node based on determining that the RDMA operation will be performed, whereby the available node is a primary node or a secondary node. The method may then include sending the determined RDMA operation and a data element to the determined available node based on the determined RDMA operation being the insert operation. The method may further include receiving a remote pointer in response to sending the insert operation, whereby the remote pointer corresponds to a memory range mapped between the primary node and the secondary node. The method may also include storing the received remote pointer. The method may then include retrieving the stored remote pointer based on the determined RDMA operation being the update operation, the read operation, or the delete operation. The method may further include sending the stored remote pointer, the data element, and the update operation to the available node based on the determined RDMA operation being the update operation. The method may also include sending the stored remote pointer and the determined RDMA operation to the available node based on the determined RDMA operation being the read operation or the delete operation, whereby the available node performs the sent RDMA operation, and whereby the available node forwards the sent RDMA operation to the secondary node if the available node is the primary node and the sent RDMA operation is the insert operation, the update operation, or the delete operation.

According to yet another exemplary embodiment, a computer program product for remote direct memory access (RDMA) failover is provided. The computer program product may include one or more computer-readable storage devices and program instructions stored on at least one of the one or more tangible storage devices, the program instructions executable by a processor. The computer program product may include program instructions to determine an RDMA operation will be performed, whereby the RDMA operation is one of an update operation, an insert operation, a read operation or a delete operation. The computer program product may also include program instructions to determine an available node based on determining that the RDMA operation will be performed, whereby the available node is a primary node or a secondary node. The computer program product may then include program instructions to send the determined RDMA operation and a data element to the determined available node based on the determined RDMA operation being the insert operation. The computer program product may further include program instructions to receive a remote pointer in response to sending the insert operation, whereby the remote pointer corresponds to a memory range mapped between the primary node and the secondary node. The computer program product may also include program instructions to store the received remote pointer. The computer program product may then include program instructions to retrieve the stored remote pointer based on the determined RDMA operation being the update operation, the read operation, or the delete operation. The computer program product may further include program instructions to send the stored remote pointer, the data element, and the update operation to the available node based on the determined RDMA operation being the update operation. The computer program product may also include program instructions to send the stored remote pointer and the determined RDMA operation to the available node based on the determined RDMA operation being the read operation or the delete operation, whereby the available node performs the sent RDMA operation, and whereby the available node forwards the sent RDMA operation to the secondary node if the available node is the primary node and the sent RDMA operation is the insert operation, the update operation, or the delete operation.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
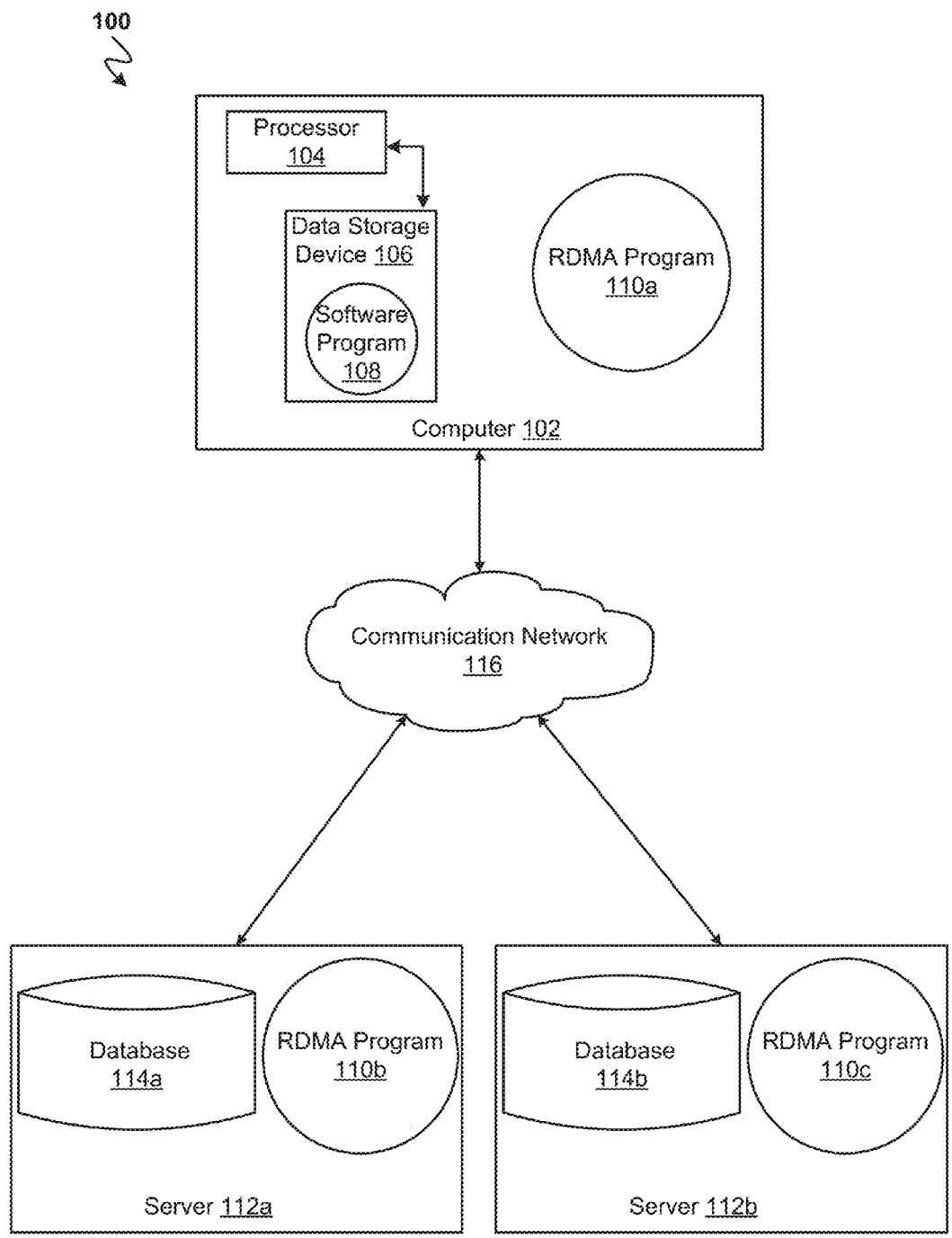
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for remote direct memory access (RDMA) to High Availability (HA) nodes having uniform virtual memory capabilities, such as a Coherent Accelerator Processor Interface (CAPI). As such, the present embodiment has the capacity to improve the technical field of remote direct memory access by providing a software-based solution to synchronize the virtual memory addresses of a master node and a failover slave node in CAPI capable systems. More specifically, when a client node needs to perform an RDMA operation, the master node and slave nodes may map potentially different physical memory addresses to a common virtual memory address. Operations requested by the client node may then be passed to the master node and the master node may pass the operation to the slave node so that the slave node may perform the same operation. In the event that the master node is unavailable, the client node's RDMA operations may failover to the slave node using the same virtual memory address as before since the slave node's memory was mapped to the same virtual memory address as the master node.

As described previously, High Availability (HA) is an important consideration in Cloud data centers. HA allows for applications to have the availability needed, independent of the operating system and application, by providing failover protection against hardware and operating system outages within a cloud information technology (IT) environment.

Direct memory access (DMA) operations may be used to complete high performance memory operations on remote computers (e.g., servers) by allowing attached devices within the computer (e.g., a network adapter) to directly access designated portions of memory (i.e., pinned memory) through hardware memory managers instead of using additional resources to traverse through the central processing unit (CPU) and operating system (OS) to access memory. DMA operations performed remotely (e.g., over a network connection) from a first computer's network adapter to a second computer's network adapter allows for high performance remote direct memory access (RDMA) operations to by performed.

Memory management hardware in traditional computer architectures (e.g., Intel®-based system (Intel and all Intel-based trademarks and logos are trademarks or registered trademarks of Intel Corporation and/or its affiliates)) provide physical memory access to attached devices (e.g., a network adapter attached via a Peripheral Component Interconnect Express (PCI-E) bus) for DMA/RDMA while providing virtual memory addresses to applications and the OS. By giving physical memory addresses for RDMA operations, it may be difficult to synchronize RDMA operations to one computer (e.g., master server node) and to a failover computer (e.g., slave server node) since there may be a very high probability that the physical memory addresses of both computers will not be identical, even if the servers are configured in the same way (e.g., due to variables, such as bootstrap sequence, etc.). Thus, the performance advantages of RDMA operations may be significantly reduced due to additional resources that may be needed to have a client node (i.e., a computer requesting an RDMA operation) maintain different sets of memory addresses for each target node (e.g., master node and one or more slave nodes for failover that may handle the RDMA request) and/or custom hardware may be needed to implement mirrored RDMA operations across multiple computers when the memory addresses being accessed through RDMA may not match.

Therefore, it may be advantageous to, among other things, provide a way to provide for implementing High Availability (HA) for one-sided RDMA through software that uses existing RDMA adapters and allows a client node to access a single memory address for RDMA operations regardless of which server (i.e., node) carries out the operation.

According to at least one embodiment, when the client node needs to perform an operation (i.e., RDMA operation), the master node and the slave node may map their differing physical memory locations to the same virtual memory address (i.e., common virtual memory address). When a client-node adapter sends a request to a master node, the master node may register the memory at a virtual address (e.g., 0x01). The master may then generate an access key and forward the client's request along with the access key and virtual address (e.g., 0x01) to a slave node. Thereafter, the slave node may perform the same registration at the same virtual memory address (e.g., 0x01) and store the access key provided by the master node. Thus, the client may only need to have one virtual memory address and one access key in order to perform RDMA operations on all server nodes (i.e., master and slave HA servers).

When the client requests the master node to perform an operation (e.g., insert, delete, update), the master node forwards the request to the slave node that may then perform the same operation against the slave node's memory to mirror the master node's memory. Forwarding logic may be implemented using firmware in the master node's adapter that forwards the request to the slave node before the software running on the master node receives the request. According to at least one other embodiment, a bump-in-the-wire type field-programmable gate array (FPGA) module in the master node adapter may forward the request to the slave node before it is forwarded to the software running on the maser node. According to yet another embodiment, the master node's adapter forwards the request to the software running on the master node that performs the requested operation and also forwards the request to the slave node.

If the master node becomes unavailable (e.g., hardware malfunction, virtual machine crashes, etc.) the client node adapter may failover to the slave node using the same virtual address (e.g., 0x01) stored in the client node adapter's table that was used for the master node and use the same access key provided by the master node when the client node requested access to the master node's memory.

Additionally, Coherent Accelerator Processor Interface (CAPI) functionality provided by the servers may be used as a translation mechanism to map physical memory to virtual memory for attached devices (e.g., network adapters) in order to perform RDMA operations using virtual memory addresses instead of unique underlying physical memory addresses.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a remote direct memory access (RDMA) program 110a. The networked computer environment 100 may also include servers 112a and 112b that are enabled to run an RDMA program 110b and 110c that may interact with a database 114a and 114b and a communication network 116. The networked computer environment 100 may include a plurality of computers 102 and servers 112a and 112b. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computers 112a and 112b via the communications network 116. The communications network 116 may include connections, such as wire, wireless communication links, or fiber optic cables. As will be discussed with reference to FIG. 7, server computers 112a and 112b may include internal components 902a and external components 904a, respectively, and client computer 102 may include internal components 902b and external components 904b, respectively. Server computers 112a and 112b may also operate in a cloud computing service model, such as Software as a Service (SaaS), Platform as a Service (PaaS), or Infrastructure as a Service (IaaS). Server computers 112a and 112b may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114a-b. According to various implementations of the present embodiment, the RDMA program 110a-c may interact with a database 114a-b that may be embedded in various storage devices, such as, but not limited to a computer/mobile device 102, a networked server 112a, 112b, or a cloud storage service.

According to the present embodiment, a user using a client computer 102 or a server computers 112a, 112b may use the RDMA program 110a, 110b, and 110c (respectively) to allow a client computer node (e.g., client computer 102) to perform RDMA operations on a master server (e.g., server computer 112a) and may have the same RDMA operations forwarded to a failover slave node (e.g., server computer 112b) such that the client computer node may failover to the slave node using the same virtual memory address. The RDMA failover method is explained in more detail below with respect to FIGS. 2-6B.

Figure 2:
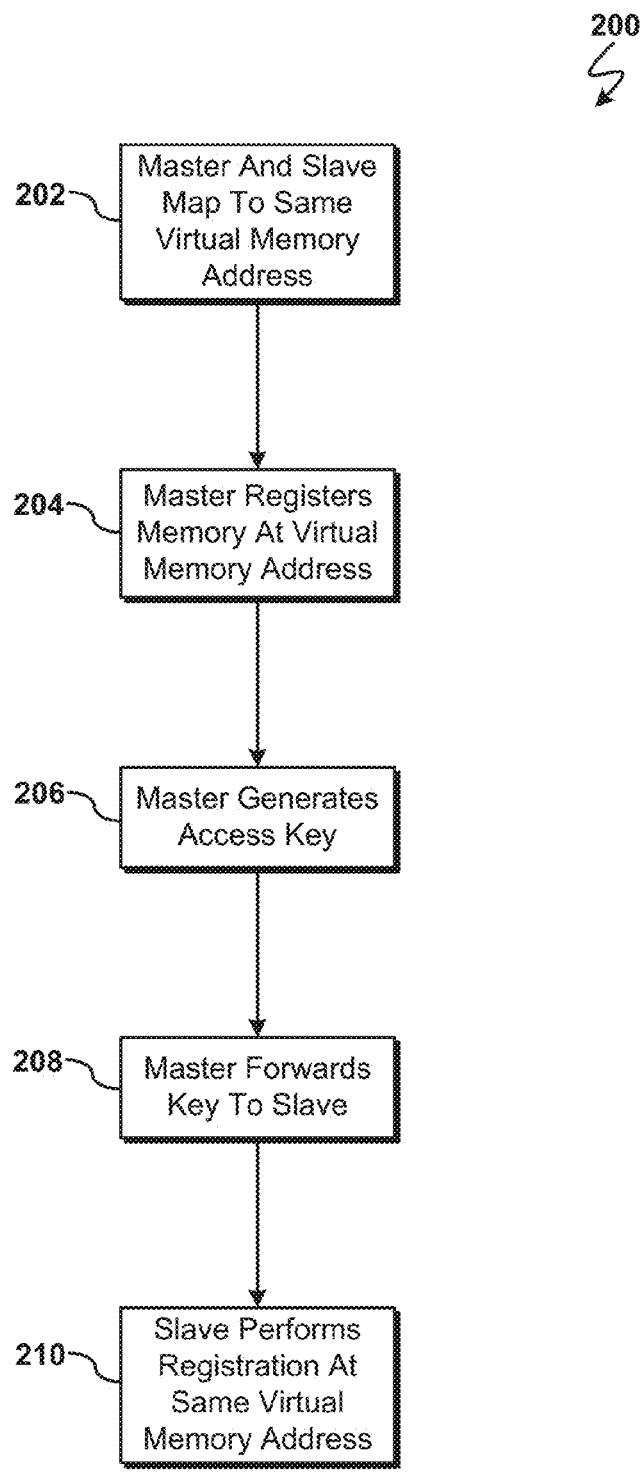
FIG. 2 is an operational flowchart illustrating a process for server-side preparation according to at least one embodiment.

Referring now to FIG. 2, an operational flowchart illustrating the exemplary server-side preparation process 200 by the RDMA program 110a-c (FIG. 1) according to at least one embodiment is depicted.

At 202, the master node and slave node map to the same (i.e., common) virtual memory address. According to at least one embodiment, the master node (e.g., server computer 112a (FIG. 1)) and one or more slave nodes (e.g., server computer 112b (FIG. 1)) may use a known method, such as an mmap system call in Unix-based systems, to map the same size memory block to virtual address range (e.g., 0x01-0x03) for all nodes (i.e., the master node and one or more slave nodes). The master node and the slave node(s) may allocate the same amount of memory initially. Depending on the virtual memory addresses the master node may have been given as a result of the initial memory allocation, the slave may mmap the slave node's allocated memory range to the same addresses.

Next, at 204, the master node registers virtual memory with an RDMA capable network adapter associated with the master node at the common virtual memory address determined at 202. According to at least one embodiment, the Coherent Accelerator Processor Interface (CAPI) memory manager may automatically translate the common virtual memory addresses (e.g., 0x01) to the physical memory addresses when the network adapter performs direct memory access (DMA) operations.

For example, the master node's CAPI memory manager may register memory address 0xA9 to the common virtual memory address 0x01 that the master and slave nodes mapped to previously at 202.

Then, at 206, the master node generates a memory access key. According to at least one embodiment, a device driver running on the master node may generate the memory access key. The device driver may use a known algorithm to generate the access key, whereby the access key may be used as a unique identifier. The master node may then save the generated access key locally in a data repository, such as a database 114a (FIG. 1).

At 208, the master node forwards the generated key to the one or more slave nodes (e.g., 112*b* (FIG. 1)). According to at least one embodiment, the master node may send the access key to the slave node via a network connection for the slave node to save locally in a data repository, such as a database 114*b* (FIG. 1).

Next, at 210, the slave node also registers memory at the common virtual memory address determined at 202. According to at least one embodiment, the slave node may register physical memory using the slave node's CAPI memory manager to the common virtual memory address (e.g., 0x01).

For example, the slave node's CAPI memory manager may translate physical memory address 0xB1 to the common virtual memory address 0x01 that the master and slave nodes mapped to previously (i.e., at 202) using the mmap system call. Thus, the master node and slave nodes will have mapped their unique physical memory addresses to the same virtual address allowing the client computer to only have to use one virtual address for requesting RDMA operations.

Figure 3:
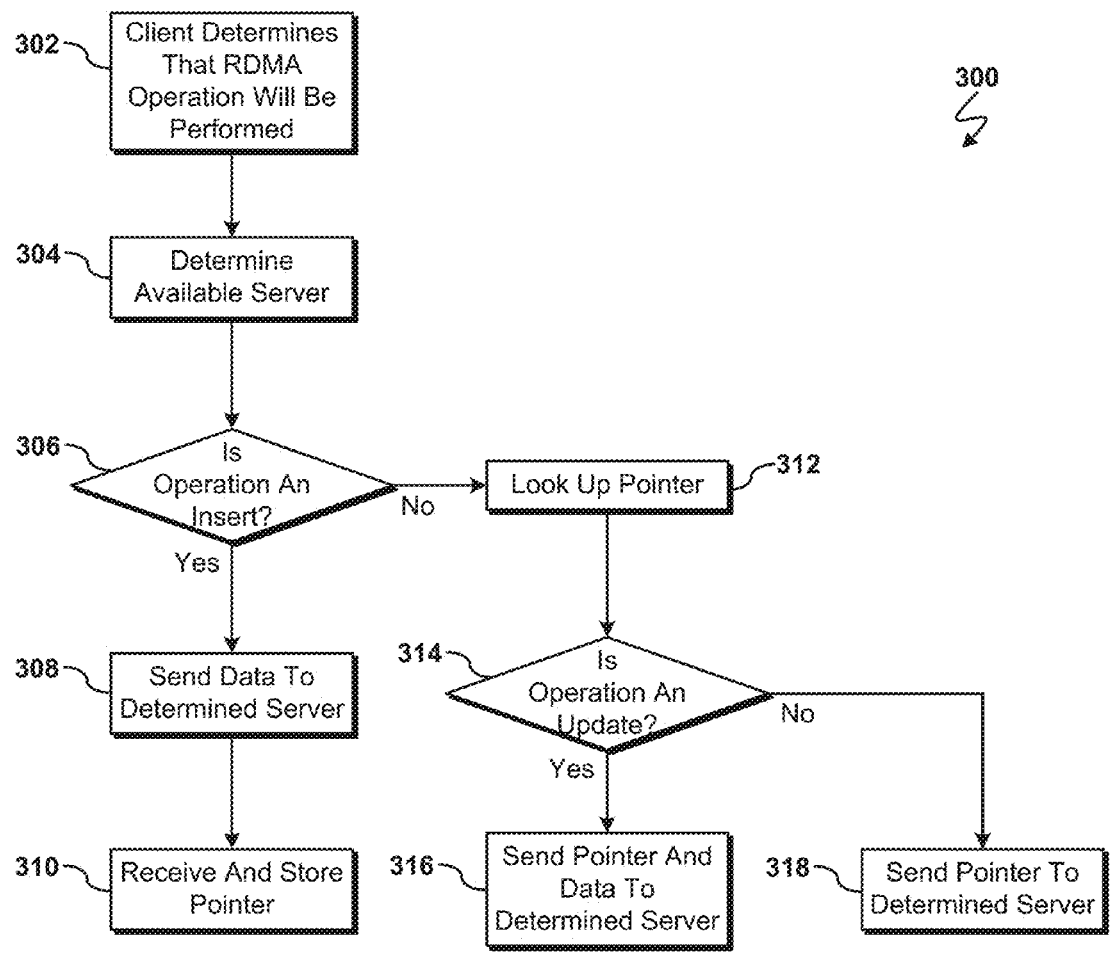
FIG. 3 is an operational flowchart illustrating a process for client-side remote direct memory access (RDMA) operations according to at least one embodiment.

Referring now to FIG. 3, an operational flowchart illustrating the exemplary client-side RDMA process 300 by the RDMA program 110*a-c* (FIG. 1) according to at least one embodiment is depicted.

At 302, the client computer determines that an RDMA operation will be performed. According to at least one embodiment, an RDMA operation may be determined based on an application or the OS on the client computer attempting to perform a memory operation (e.g., insert, update, delete, etc.) on a remote server (e.g., master server, such as server computer 112*a* (FIG. 1)).

Next, at 304, an available server is determined. According to at least one embodiment, known node status methods may be used to determine server/node availability. For example, a heartbeat mechanism may be used to send data packets at regular intervals to indicate a node is available or a query may be made to the master node determine the available nodes. According to at least one other embodiment, the availability of a primary (i.e., master) node may first be determined, and if the primary node is determined to be unavailable, the availability of a failover secondary (i.e., slave) node may then be determined, etc.

Then, at 306, it is determined if the RDMA operation to be performed is an insert operation. According to at least one embodiment, the operation type is identified using known methods to determine if the operation is an insert operation.

If it is determined that the operation is an insert operation at 306, the data to be inserted is sent to the determined server at 308. According to at least one embodiment, the insert operation may include an argument that contains the data to be inserted into memory via RDMA. This data may be sent to the available server (e.g., master node or slave node) determined at 304.

Then, at 310, the client computer will receive and store a remote pointer from the server that was the destination for the data sent at 308. According to at least one embodiment, the server that was sent data to insert via RDMA may perform the requested operation, as will be described below with respect to FIGS. 4 and 5, and may return a pointer to the client computer such that the client computer may directly access the server's memory at a later time. The memory point sent to the client computer may be a combination of a starting memory address (e.g., 0x01 for a virtual address range of 0x01-0x03) along with an access key (e.g., 0xFFF1). Thereafter, the client computer may receive the remote pointer (i.e., starting address and access key) and store the received remote pointer in a data structure, such as a hash map, for later look up.

However, if it is determined that the RDMA operation to be performed is not an insert at 306, the client computer will look up a remote pointer corresponding to the memory location the RDMA operation will use at 312. According to at least one embodiment, when the client computer intends to perform an RDMA operation that is not an insert operation (e.g., update, read, and delete), the operation may be performed on a memory location that may have already had an insert operation performed, and thus the client computer was previously sent and stored a remote pointer as described previously at 310. For example, if the client computer wants to perform an update operation on an existing memory location, the client computer may look up the remote pointer corresponding to the existing memory location in a hash map to retrieve the remote pointer for use in the update operation.

Next, at 314, it is determined if the RDMA operation to be performed is an update operation. According to at least one embodiment, the operation type is identified using known methods to determine if the operation is an update operation.

If it is determined that the RDMA operation to be performed is an update operation at 314, then the client computer sends the remote pointer and the data associated with the update operation to the determined available server at 316. For example, after looking up and retrieving the remote pointer including starting memory address 0x01 and access key 0xFFF1, the client computer may send the remote pointer and the data that will be used to update the server's memory to the server that was determined to be available previously, such as the master server.

However, if it is determined that the RDMA operation to be performed is not an update operation at 314, then the remote pointer is sent to the determined available server at 318. According to at least one embodiment, if the RDMA operation is not an insert or update operation (i.e., the operation is a read or delete operation), the client computer may send the memory pointer corresponding to the memory location the client computer wants to read or delete along with the operation to be performed (i.e., read or delete) to the server that was determined to be available previously at 304.

Figure 4:
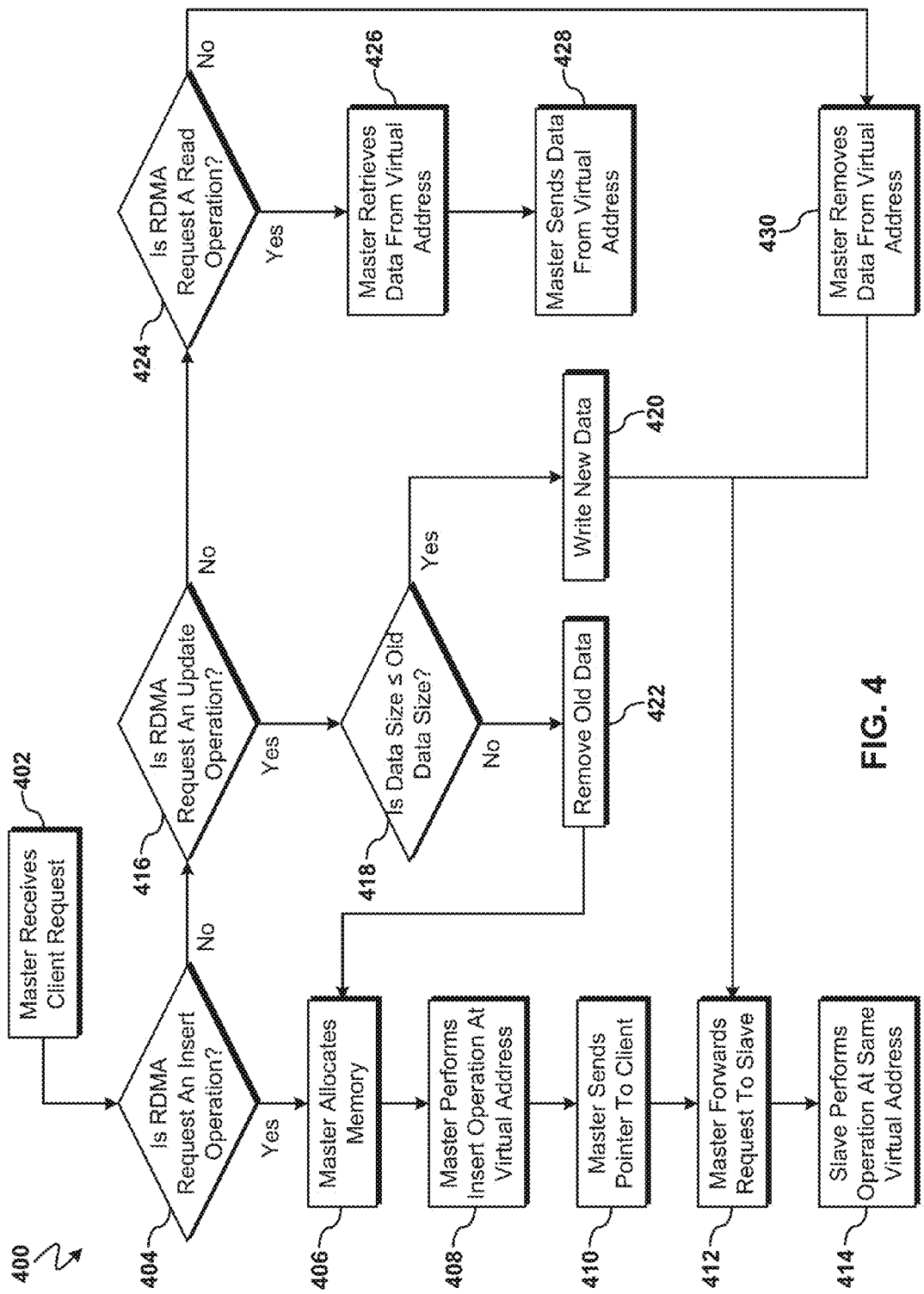
FIG. 4 is an operational flowchart illustrating a process for handling RDMA requests at the master node according to at least one embodiment.

Referring now to FIG. 4, an operational flowchart illustrating the exemplary master node RDMA request handling process 400 by the RDMA program 110*a-c* (FIG. 1) according to at least one embodiment is depicted.

At 402, the master node (i.e., server) receives an RDMA request from the client computer. According to at least one embodiment, the RDMA request (including a remote pointer and/or data elements depending on the operation) may be received by the master node at the master node's network adapter. Using known methods, the master node may check the received access key included in the remote pointer before allowing the client's requested RDMA operation to be processed.

Then, at 404 it is determined if the received RDMA operation is an insert operation. According to at least one embodiment, the client computer may send the master node the data for the insert operation without a remote pointer as described previously at 308 (FIG. 3). Thus, the master node may identify the operation is an insert since there is a data element and no accompanying remote pointer received from the client computer. According to at least one other embodiment, the master node may also receive an insert operator expressly indicating the desired operation.

If it was determined that the RDMA operation was an insert operation at 404, then the master node allocates memory on the master node at 406. According to at least one embodiment, the master node may identify available memory within the memory that was allocated as described previously with respect to FIG. 2. Once an available memory region has been identified, the identified memory region may be allocated for the insert operation. For example, memory range 0x01-0x09 may have been initially allocated with the slave node. After the insert operation is received from the client, the master node may determine that 0x03-0x05 is available for the insert operation, and thus 0x03-0x05 may be allocated for the insert operation.

Then, at 408, the master node performs the insert operation at the virtual memory address allocated previously. According to at least one embodiment, the data elements received from the client previously at 402 may be inserted into the memory that was allocated previously at 406 using direct memory access (DMA).

Next, at 410, the master node sends a remote pointer to the client computer. According to at least one embodiment, the remote pointer may include the beginning memory address of the memory address range related to the RDMA operation and the access key. The access key may be the access key generated previously at 206 (FIG. 2). The access key and the first memory address may then be sent to, and received by, the client computer for storage and later use as described above at 310 (FIG. 3). For example, if the access key generated was 0xFFF1 and the memory range containing the newly inserted data elements is 0x03-0x05, the master node may send the client computer memory address 0x03 and access key 0xFFF1 as the remote pointer.

Next, at 412, the master node forwards the received request to the slave node. According to at least one embodiment, the master node's network adapter may include a bump-in-the-wire type field-programmable gate array (FPGA) module that may be programmed to forward the client's request (along with any data elements) and the remote pointer to the slave node's network adapter over a network connection.

According to at least one other embodiment, the firmware of the master node's network adapter may programmed to forward the request and remote pointer to the slave node before software running on the master node receives the client's request.

According to yet another embodiment, the master node may forward the client's request to software running on the master node, and the software running on the master node may forward the client's original request and remote pointer to the slave node in addition to performing the requested operation.

Then, at 414, the slave node handles the forwarded request by performing the same write (insert or overwrite) operation at the same virtual memory address (e.g., 0x03). According to at least one embodiment, the slave node's network adapter may perform the RDMA write operation received from the master node at the virtual memory address the master node forwarded to the slave node. Using the slave node's CAPI memory manager, the virtual memory address sent by the master node may be translated to the physical memory address of the slave node, and the RDMA operation may then be performed on the slave node's physical memory address.

If it is determined at 404 that the received RDMA request is not an insert operation, then it is determined if the received RDMA request is an update operation at 416. According to at least one embodiment, it may be determined that the RDMA request is an update operation if a remote pointer and at least one data element were received by the master node at 402. According to at least one other embodiment, the master node may also receive an update operator expressly indicating the desired operation.

If it is determined that the RDMA request is an update operation at 416, then it is determined if the size of the new data element for the update is less than or equal to the size of the old data element stored at the memory location corresponding to the received remote pointer at 418. According to at least one embodiment, known methods may be used to determine the size of the received new data element and to determine the size of the old data element associated with the remote pointer provided by the client computer. Then, the size the of new data element may be compared with the size of the old data element associated with the client-provided remote pointer.

If it is determined that the size of the new data element is less than or equal to the size of the old data element at 418, the new data element is written to the memory region corresponding to the client-provided remote pointer at 420. According to at least one embodiment, the master node may overwrite the old data element with the new data element using DMA in conjunction with the client-provided remote pointer. Thereafter, the master node RDMA request handling process 400 proceeds to 412 to forward the update request and remote pointer to the slave node as described previously.

However, if it is determined that the size of the new data element is not less than or equal to the size of the old data element at 418, the old data element stored at the memory region corresponding to the client-provided remote pointer is removed at 422. According to at least one embodiment, the old data element corresponding to the client-provided remote pointer is removed using known methods, such as by marking the memory range containing the old element as unused, overwriting the old element with junk data, etc. Thereafter, the master node RDMA request handling process 400 proceeds to 406 to allocate memory sufficient to store the new data element.

If it was determined that the received RDMA request is not an update operation at 416, it is determined if the received RDMA request is a read operation at 424. According to at least one embodiment, it may be determined that the RDMA request is a read operation based on receiving a read operator along with the remote pointer from the client computer at 402.

If it was determined that the received RDMA request is a read operation at 424, then the master node retrieves the data stored from the virtual memory address corresponding to the client-provided remote pointer at 426. According to at least one embodiment, the starting memory address included in the client-provided remote pointer may be used to identify the data element that to be read. The data element corresponding to the starting memory address may then be retrieved from memory.

Then, at 428, the master node sends the data retrieved from the virtual address at 426 to the client computer. According to at least one embodiment, the master node sends the data element read from the memory location corresponding to the client-provided remote pointer to the client computer.

If it was determined that the received RDMA request is not a read operation at 424, then the master node removes the data element from the virtual address corresponding to the client-provided remote pointer at 430. According to at least one embodiment, if the received RDMA request was determined to not be an insert operation (i.e., at 404), an update operation (i.e., at 416), or a read operation (i.e., at 424), it may be determined that the operation is a delete operation. According to at least one other embodiment, the client computer may send the delete operator along with the remote pointer to the master node at 402 expressly indicating that the RDMA operation is a delete operation. Then, the old data element corresponding to the client-provided remote pointer may be removed using known methods, such as by marking the memory range containing the old element as unused, overwriting the old element with junk data, etc. Thereafter, the master node RDMA request handling process 400 proceeds to 412 to forward the delete request and remote pointer to the slave node as described previously.

Figure 5:
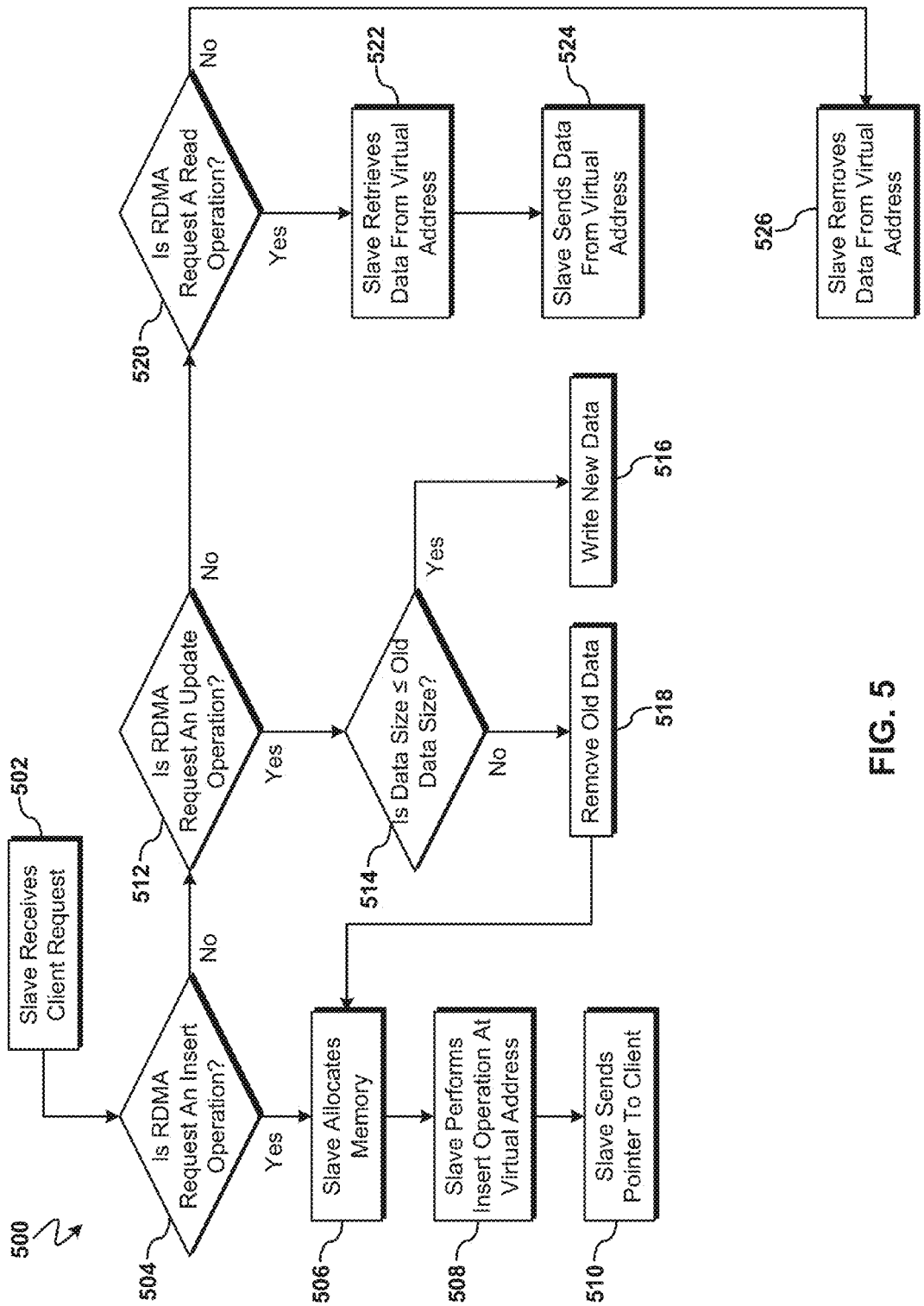
FIG. 5 is an operational flowchart illustrating a process for handling RDMA requests at the slave node according to at least one embodiment.

Referring now to FIG. 5, an operational flowchart illustrating the exemplary slave node RDMA request handling process 500 by the RDMA program 110*a-c* (FIG. 1) according to at least one embodiment is depicted.

At 502, the slave node (i.e., server) receives an RDMA request from the client computer. According to at least one embodiment, the RDMA request (including a remote pointer and/or data elements depending on the operation) may be received by the slave node at the slave node's network adapter. Using known methods, the slave node may check the received access key included in the remote pointer before allowing the client's requested RDMA operation to be processed.

Then, at 504 it is determined if the received RDMA operation is an insert operation. According to at least one embodiment, the client computer may send the slave node the data for the insert operation without a remote pointer as described previously at 308 (FIG. 3). Thus, the slave node may identify the operation is an insert since there is a data element and no accompanying remote pointer received from the client computer. According to at least one other embodiment, the slave node may also receive an insert operator expressly indicating the desired operation.

If it was determined that the RDMA operation was an insert operation at 504, then the slave node allocates memory on the slave node at 506. According to at least one embodiment, the slave node may identify available memory within the memory that was allocated as described previously with respect to FIG. 2. Once an available memory region has been identified, the identified memory region may be allocated for the insert operation. For example, memory range 0x01-0x09 may have been initially allocated with the master node. After the insert operation is received from the client, the slave node may determine that 0x03-0x05 is available for the insert operation, and thus 0x03-0x05 may be allocated for the insert operation.

Then, at 508, the slave node performs the insert operation at the virtual memory address allocated previously. According to at least one embodiment, the data elements received from the client previously at 502 may be inserted into the memory that was allocated previously at 506 using direct memory access (DMA).

Next, at 510, the slave node sends a remote pointer to the client computer. According to at least one embodiment, the remote pointer may include the beginning memory address of the memory address range related to the RDMA operation and the access key. The access key may be the access key generated previously at 206 (FIG. 2). The access key and the first memory address may then be sent to, and received by, the client computer for storage and later use as described above at 310 (FIG. 3). For example, if the access key generated was 0xFFF1 and the memory range containing the newly inserted data elements is 0x03-0x05, the slave node may send the client computer memory address 0x03 and access key 0xFFF1 as the remote pointer.

If it is determined at 504 that the received RDMA request is not an insert operation, then it is determined if the received RDMA request is an update operation at 512. According to at least one embodiment, it may be determined that the RDMA request is an update operation if a remote pointer and at least one data element were received by the slave node at 502. According to at least one other embodiment, the slave node may also receive an update operator expressly indicating the desired operation.

If it is determined that the RDMA request is an update operation at 512, then it is determined if the size of the new data element for the update is less than or equal to the size of the old data element stored at the memory location corresponding to the received remote pointer at 514. According to at least one embodiment, known methods may be used to determine the size of the received new data element and to determine the size of the old data element associated with the remote pointer provided by the client computer. Then, the size the of new data element may be compared with the size of the old data element associated with the client-provided remote pointer.

If it is determined that the size of the new data element is less than or equal to the size of the old data element at 514, the new data element is written to the memory region corresponding to the client-provided remote pointer at 516. According to at least one embodiment, the slave node may overwrite the old data element with the new data element using DMA in conjunction with the client-provided remote pointer.

However, if it is determined that the size of the new data element is not less than or equal to the size of the old data element at 514, the old data element stored at the memory region corresponding to the client-provided remote pointer is removed at 518. According to at least one embodiment, the old data element corresponding to the client-provided remote pointer is removed using known methods, such as by marking the memory range containing the old element as unused, overwriting the old element with junk data, etc. Thereafter, the slave node RDMA request handling process 500 proceeds to 506 to allocate memory sufficient to store the new data element.

If it was determined that the received RDMA request is not an update operation at 512, it is determined if the received RDMA request is a read operation at 520. According to at least one embodiment, it may be determined that the RDMA request is a read operation based on receiving a read operator along with the remote pointer from the client computer at 502.

If it was determined that the received RDMA request is a read operation at 520, then the slave node retrieves the data stored from the virtual memory address corresponding to the client-provided remote pointer at 522. According to at least one embodiment, the starting memory address included in the client-provided remote pointer may be used to identify the data element that to be read. The data element corresponding to the starting memory address may then be retrieved from memory on the slave node.

Then, at 524, the slave node sends the data retrieved from the virtual address at 522 to the client computer. According to at least one embodiment, the slave node sends the data element read from the memory location corresponding to the client-provided remote pointer to the client computer.

If it was determined that the received RDMA request is not a read operation at 520, then the slave node removes the data element from the virtual address corresponding to the client-provided remote pointer at 526. According to at least one embodiment, if the received RDMA request was determined to not be an insert operation (i.e., at 504), an update operation (i.e., at 512), or a read operation (i.e., at 520), it may be determined that the operation is a delete operation. According to at least one other embodiment, the client computer may send the delete operator along with the remote pointer to the slave node at 502 expressly indicating that the RDMA operation is a delete operation. Then, the old data element corresponding to the client-provided remote pointer may be removed using known methods, such as by marking the memory range containing the old element as unused, overwriting the old element with junk data, etc.

Figure 6A:
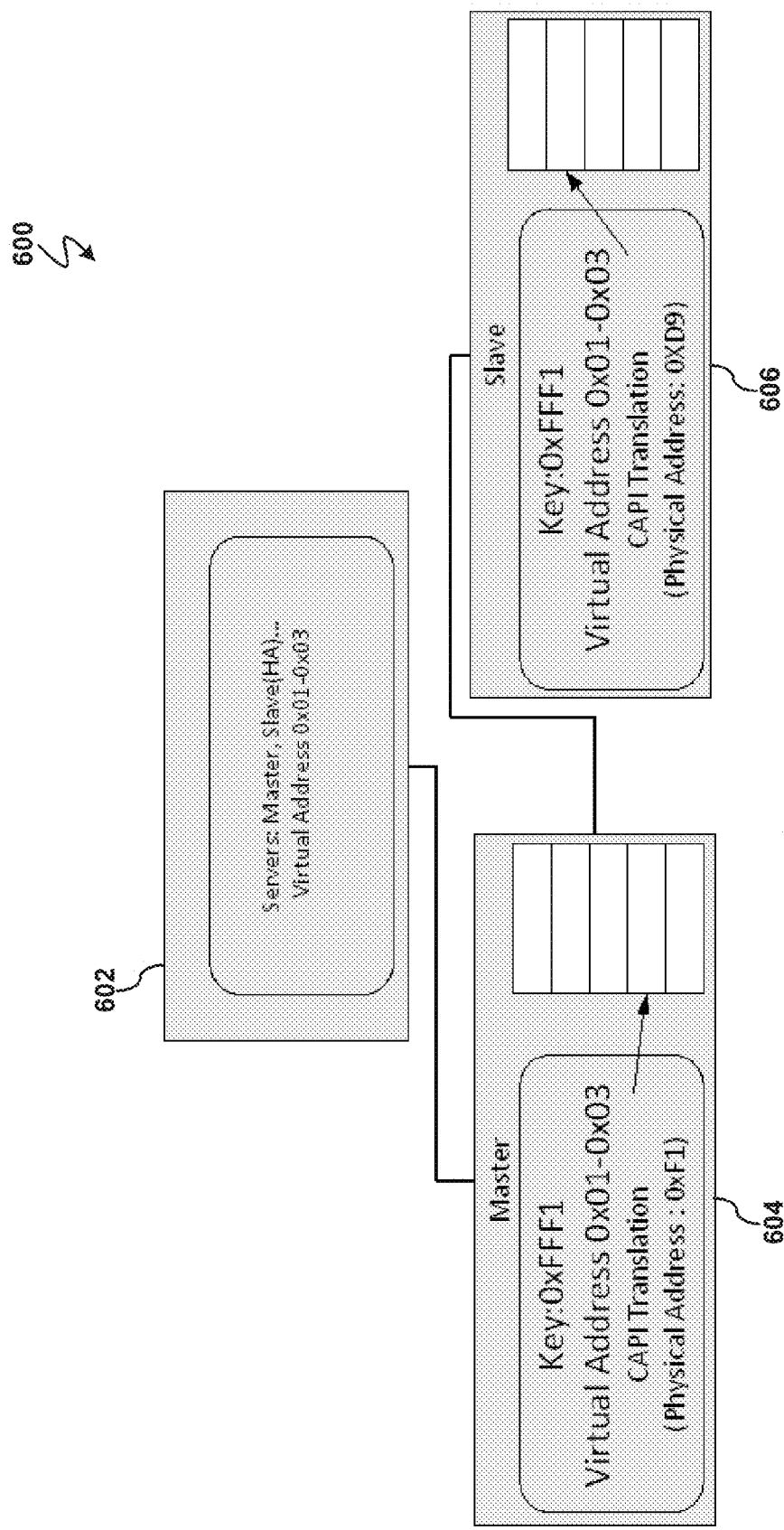
FIG. 6A is a system block diagram illustrating a client/master/slave node topology according to at least one embodiment.

Referring now to FIG. 6A, a system block diagram of an RDMA topology 600 according to at least one embodiment is depicted. The RDMA topology 600 may include a client computer 602, a master node 604, and a failover slave node 606.

In an example scenario, the master node 604 and the slave node 606 may map to the virtual memory address 0x01-0x03 as described previously at 202 (FIG. 2). Next, the master node 604 may register virtual memory address 0x01-0x03 with the network adapter, which generates access key 0xFFF1 based on device drivers for a network adapter connected to the master node 604 as described previously at 206 (FIG. 2). Thereafter, the master node 604 may forward access key 0xFFF1 to the slave node 606 as described previously at 208 (FIG. 2). Finally, the slave node 606 may register virtual memory address 0x01-0x03 by pairing the memory address with the access key sent by the master node 604 as described previously at 210 (FIG. 2).

Then, the client computer 602 may run an application that may require an RDMA insert operation to be performed on the master node's 604 memory. The client computer may determine that an RDMA operation will be performed as described previously at 302 (FIG. 3). Next, the client computer 602 may determine if the master node 604 is currently available as described previously at 304 (FIG. 3) by using a heartbeat mechanism to ascertain if the master node 604 is available. Upon determining that the master node 604 is available, the client computer 602 may send the master node 604 the RDMA insert request with an accompanying data element, as described previously at 308 (FIG. 3).

The master node 604 then receives the client computer's 602 request for the RDMA insert operation with the data element to be inserted as described previously at 402 (FIG. 4). Then, the master node 604 may determine that the received RDMA operation is an insert operation, as described previously at 404 (FIG. 4). The master node 604 may then allocate memory within the virtual memory space sufficient to store the received data element, as described previously at 406 (FIG. 4). Then, the master node 604 may insert the received data element to the allocated virtual memory address, as described previously at 408 (FIG. 4). Thereafter, the master node 604 may send a remote pointer that includes the starting address of the memory allocated for the received data element and the access key 0xFFF1, as described previously at 410 (FIG. 4). Then, the master node 604 may forward the RDMA insert request and remote pointer to the slave node 606 as described previously at 412 (FIG. 4). Finally, the slave node 606 may perform the received insert operation on the slave node's memory as described previously at 414 (FIG. 4).

Figure 6B:
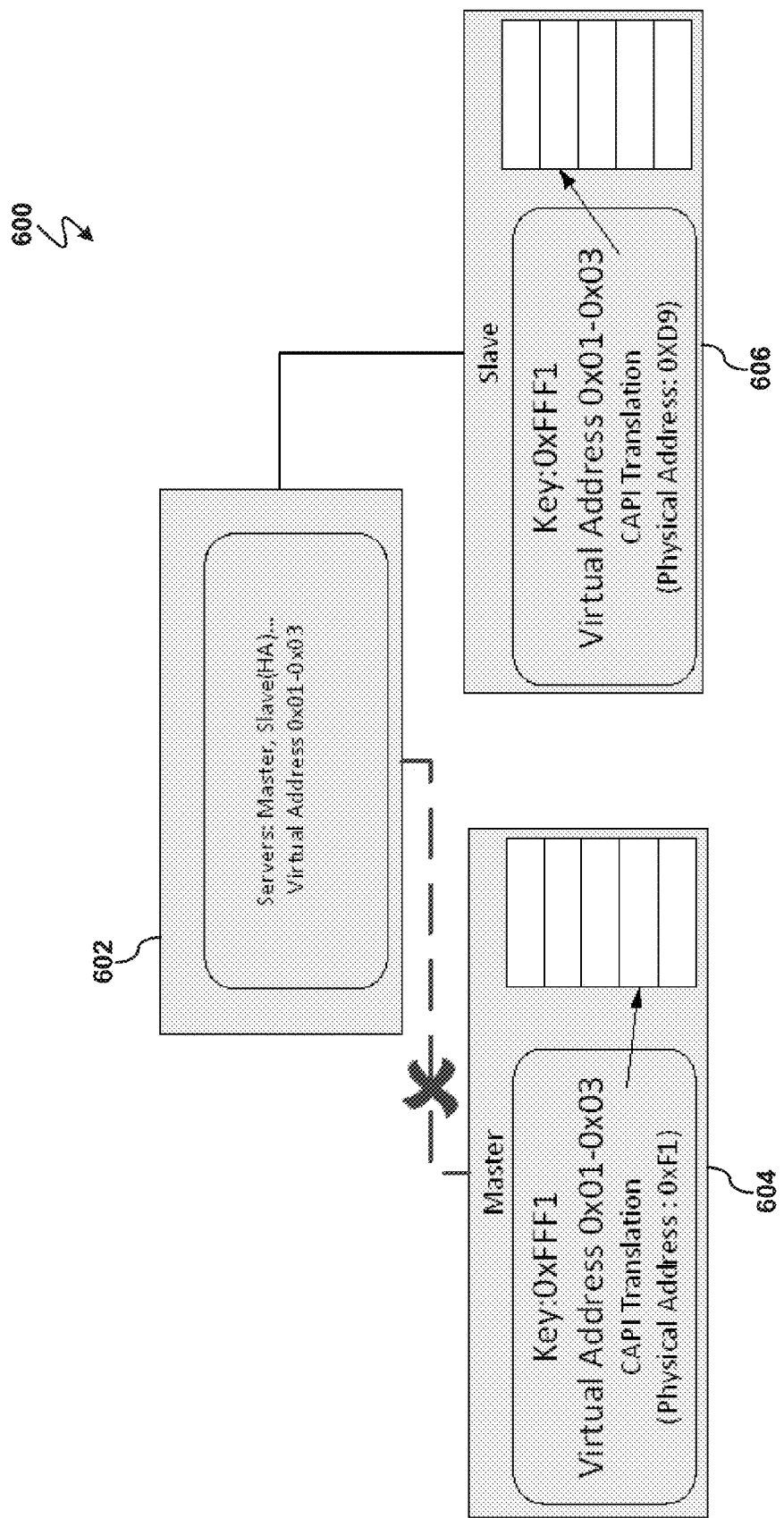
FIG. 6B is a system block diagram illustrating a client/master/slave node topology during a failover event according to at least one embodiment.

Referring now to FIG. 6B, a system block diagram of an RDMA topology 600 where the master node 604 as become unavailable (i.e., during a failover event) according to at least one embodiment is depicted. The RDMA topology 600 may include a client computer 602, a master node 604, and a failover slave node 606.

The RDMA topology 600 may function in the same manner in the previously described scenario (i.e., FIG. 6A) when the master node 604 fails until the client computer 602 determines if the master node 604 is available, as described previously at 304 (FIG. 3). Once the client computer 602 attempts to ascertain if the master node 604 is available by using a known node availability method, such as a heartbeat, the client computer 602 may determine that the master node 604 is unavailable and may failover to the slave node 606, as described previously at 304 (FIG. 3). Having determined that the master node 604 is not available, the client computer 602 may send the RDMA insert request to the slave node 606, as described previously at 308 (FIG. 3).

The slave node 606 then receives the client computer's 602 request for the RDMA insert operation as described previously at 502 (FIG. 5). Then, the slave node 606 may determine that the received RDMA operation is an insert operation, as described previously at 504 (FIG. 5). The slave node 606 may then allocate memory within the slave node's 606 virtual memory space sufficient to store the received data element, as described previously at 506 (FIG. 5). The slave node 606 may then insert the received data element to the allocated virtual memory address, as described previously at 508 (FIG. 5). Thereafter, the slave node 606 may send a remote pointer that includes the starting address of the memory allocated for the received data element and the access key 0xFFF1, as described previously at 510 (FIG. 5).

It may be appreciated that FIGS. 2-6B provide only an illustration of one embodiment and do not imply any limitations with regard to how different embodiments may be implemented. Many modifications to the depicted embodiment(s) may be made based on design and implementation requirements.

Figure 7:
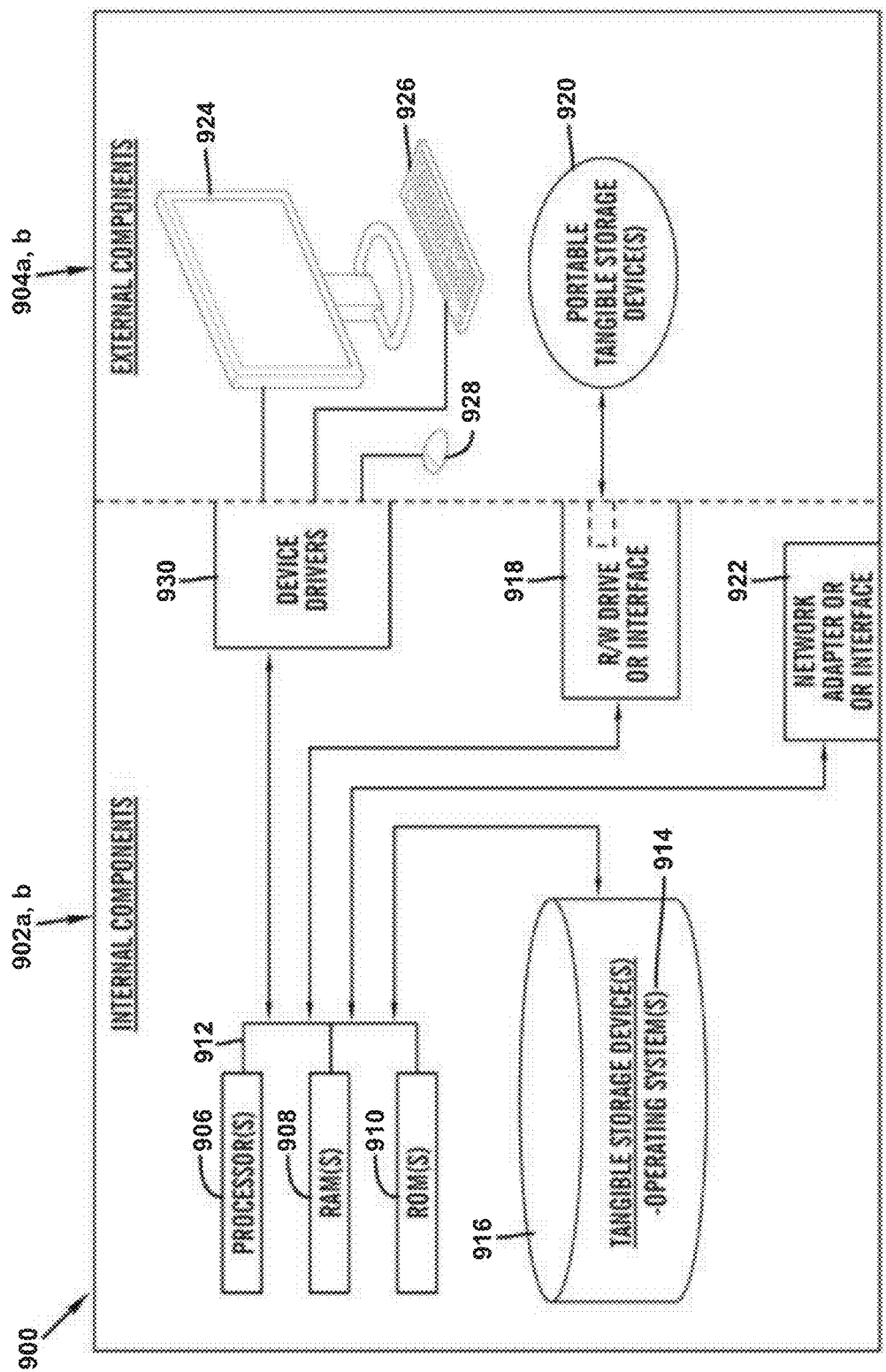
FIG. 7 is a block diagram of internal and external components of computers and servers depicted in FIG. 1 according to at least one embodiment.

FIG. 7 is a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network servers 112a and 112b (FIG. 1) may include respective sets of internal components 902 a, b and external components 904 a, b illustrated in FIG. 7. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the software program 108 (FIG. 1) and the RDMA program 110a (FIG. 1) in client computer 102 (FIG. 1) and the RDMA program 110b and 110c (FIG. 1) in network servers 112a and 112b (FIG. 1), may be stored on one or more computer-readable tangible storage devices 916 for execution by one or more processors 906 via one or more RAMs 908 (which typically include cache memory). In the embodiment illustrated in FIG. 7, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the RDMA program 110a, 110b, and 110c (FIG. 1) can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the RDMA program 110a (FIG. 1) in client computer 102 (FIG. 1) and the RDMA program 110b and 110c (FIG. 1) in network server computers 112a and 112b (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the RDMA program 110a (FIG. 1) in client computer 102 (FIG. 1) and the RDMA program 110b and 110c (FIG. 1) in network server computers 112a and 112b (FIG. 1) are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
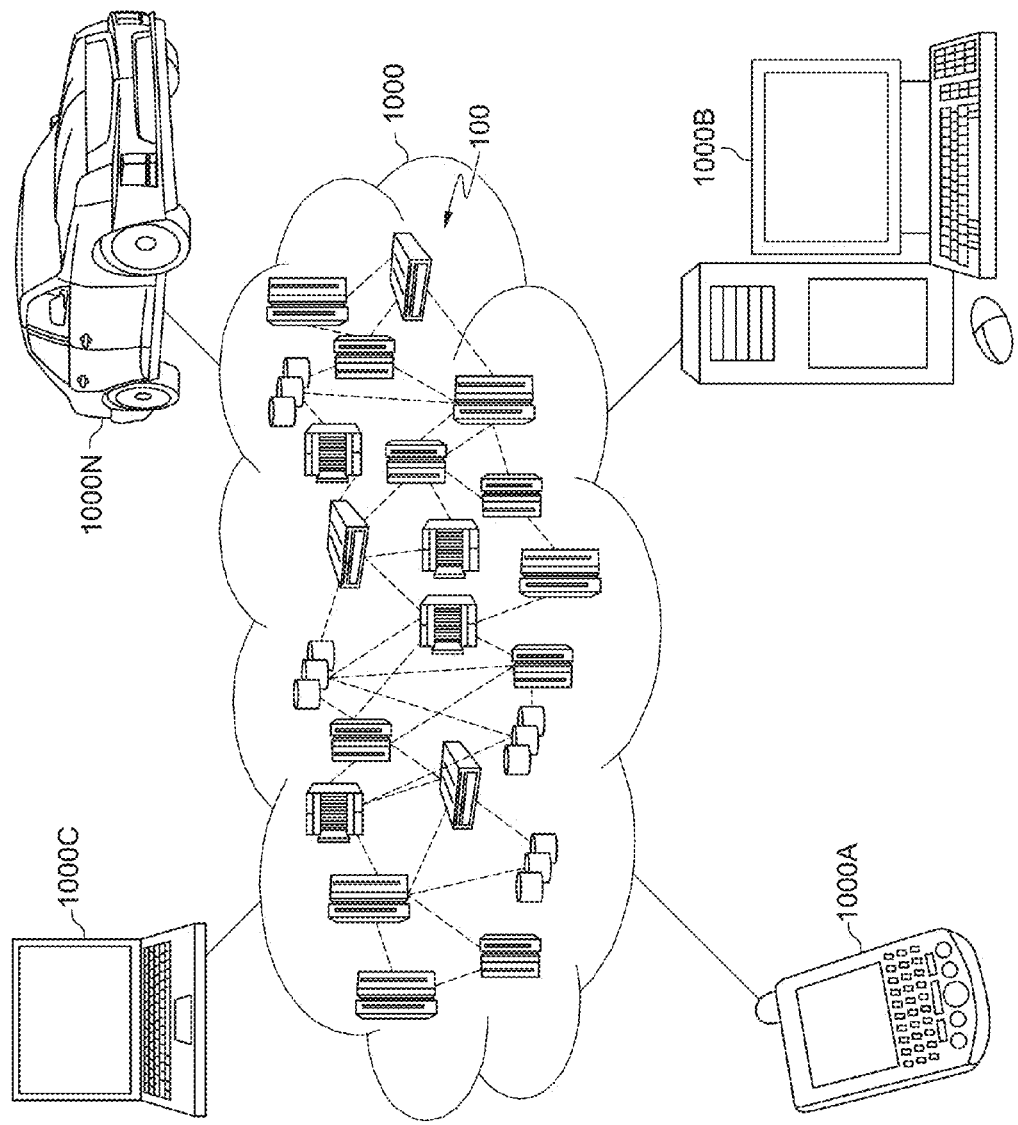
FIG. 8 is a block diagram of an illustrative cloud computing environment including the computer system depicted in FIG. 1, in accordance with an embodiment of the present disclosure.

Referring now to FIG. 8, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 8 are intended to be illustrative only and that computing nodes 100 and cloud computing environment 1000 can communicate with any type of computerized device over any type of network and/or network addressable connection (e.g., using a web browser).

Figure 9:
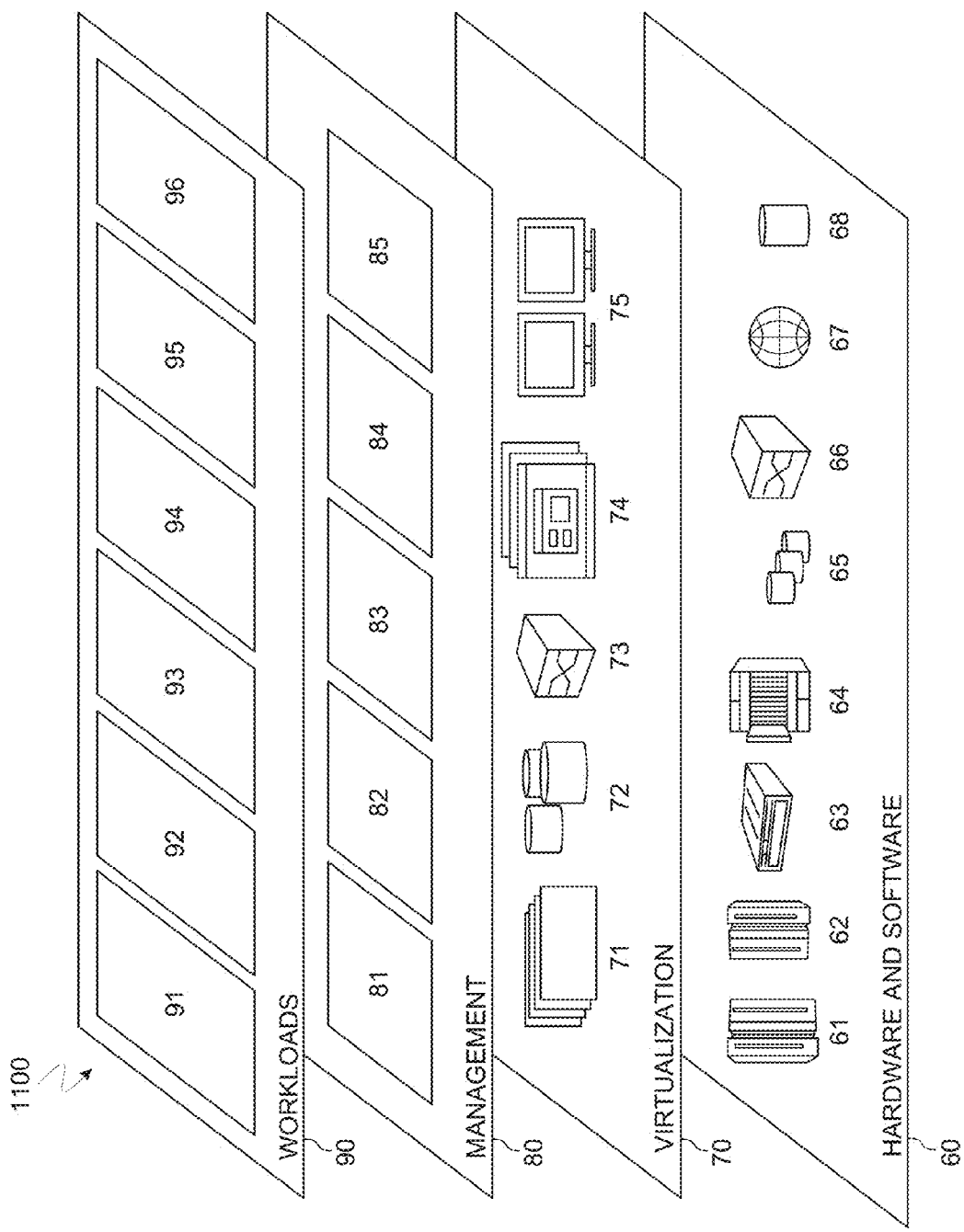
FIG. 9 is a block diagram of functional layers of the illustrative cloud computing environment of FIG. 8, in accordance with an embodiment of the present disclosure.

Referring now to FIG. 9, a set of functional abstraction layers 1100 provided by cloud computing environment 1000 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and remote direct memory access (RDMA) for High Availability (HA) nodes 96. An RDMA program 110a, 110b, and 110c (FIG. 1) provides a simplified RDMA HA scheme that may use existing standard RDMA adapters.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for remote direct memory access (RDMA) failover, the method comprising:

determining an RDMA operation will be performed, wherein the RDMA operation is one of an update operation, an insert operation, a read operation or a delete operation;

determining an available node based on determining that the RDMA operation will be performed, wherein the available node is a primary node or a secondary node;

sending the determined RDMA operation and a data element to the determined available node based on the determined RDMA operation being the insert operation;

receiving a remote pointer in response to sending the insert operation, wherein the remote pointer corresponds to a memory range mapped between the primary node and the secondary node;

storing the received remote pointer;

retrieving the stored remote pointer based on the determined RDMA operation being the update operation, the read operation, or the delete operation;

sending the stored remote pointer, the data element, and the update operation to the available node based on the determined RDMA operation being the update operation;

sending the stored remote pointer and the determined RDMA operation to the available node based on the determined RDMA operation being the read operation or the delete operation; and wherein the available node performs the sent RDMA operation, wherein the available node forwards the sent RDMA operation to the secondary node if the available node is the primary node and the sent RDMA operation is the insert operation, the update operation, or the delete operation, and wherein the primary node forwards the sent RDMA operation to the secondary node using a bump-in-the-wire field-programmable gate array (FPGA) module in a network adapter associated with the primary node forwarding the sent RDMA operation to the secondary node before the sent RDMA operation is forwarded to software running on the primary node.

2. The method of claim 1, wherein the remote pointer comprises a starting memory address associated with the memory range and an access key.

3. The method of claim 2, wherein the available node performs the sent RDMA operation if the available node is sent the remote pointer and the access key associated with the remote pointer matches a local access key stored on the available node.

4. The method of claim 1, wherein determining the available node comprises using at least one of a heartbeat mechanism and a query.

5. The method of claim 1, wherein the primary node has a primary memory manager and a primary memory region mapped to the memory range and wherein the secondary node has a secondary memory manager and a secondary memory region mapped to the memory range.

6. The method of claim 5, wherein if the available node is the primary node, the primary memory manager performs the sent RDMA operation at the primary memory region, and wherein the secondary memory manager performs the forwarded RDMA operation at the secondary memory region.

7. The method of claim 6, wherein the primary memory manager and the secondary memory manager have Coherent Accelerator Processor Interface (CAPI) functionality.

8. A computer system for remote direct memory access (RDMA) failover, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

determining an RDMA operation will be performed, wherein the RDMA operation is one of an update operation, an insert operation, a read operation or a delete operation;

determining an available node based on determining that the RDMA operation will be performed, wherein the available node is a primary node or a secondary node;

sending the determined RDMA operation and a data element to the determined available node based on the determined RDMA operation being the insert operation;

receiving a remote pointer in response to sending the insert operation, wherein the remote pointer corresponds to a memory range mapped between the primary node and the secondary node;

storing the received remote pointer;

retrieving the stored remote pointer based on the determined RDMA operation being the update operation, the read operation, or the delete operation;

sending the stored remote pointer, the data element, and the update operation to the available node based on the determined RDMA operation being the update operation;

sending the stored remote pointer and the determined RDMA operation to the available node based on the determined RDMA operation being the read operation or the delete operation; and wherein the available node performs the sent RDMA operation, wherein the available node forwards the sent RDMA operation to the secondary node if the available node is the primary node and the sent RDMA operation is the insert operation, the update operation, or the delete operation, and wherein the primary node forwards the sent RDMA operation to the secondary node using a bump-in-the-wire field-programmable gate array (FPGA) module in a network adapter associated with the primary node forwarding the sent RDMA operation to the secondary node before the sent RDMA operation is forwarded to software running on the primary node.

9. The computer system of claim 8, wherein the remote pointer comprises a starting memory address associated with the memory range and an access key.

10. The computer system of claim 9, wherein the available node performs the sent RDMA operation if the available node is sent the remote pointer and the access key associated with the remote pointer matches a local access key stored on the available node.

11. The computer system of claim 8, wherein determining the available node comprises using at least one of a heartbeat mechanism and a query.

12. The computer system of claim 8, wherein the primary node has a primary memory manager and a primary memory region mapped to the memory range and wherein the secondary node has a secondary memory manager and a secondary memory region mapped to the memory range.

13. The computer system of claim 12, wherein if the available node is the primary node, the primary memory manager performs the sent RDMA operation at the primary memory region, and wherein the secondary memory manager performs the forwarded RDMA operation at the secondary memory region.

14. The computer system of claim 13, wherein the primary memory manager and the secondary memory manager have Coherent Accelerator Processor Interface (CAPI) functionality.

15. A computer program product for remote direct memory access (RDMA) failover, comprising:

one or more computer-readable storage medium and program instructions stored on at least one of the one or more tangible storage medium, the program instructions executable by a processor, the program instructions comprising:

program instructions to determine an RDMA operation will be performed, wherein the RDMA operation is one of an update operation, an insert operation, a read operation or a delete operation;

program instructions to determine an available node based on determining that the RDMA operation will be performed, wherein the available node is a primary node or a secondary node;

program instructions to send the determined RDMA operation and a data element to the determined available node based on the determined RDMA operation being the insert operation;

program instructions to receive a remote pointer in response to sending the insert operation, wherein the remote pointer corresponds to a memory range mapped between the primary node and the secondary node;

program instructions to store the received remote pointer;

program instructions to retrieve the stored remote pointer based on the determined RDMA operation being the update operation, the read operation, or the delete operation;

program instructions to send the stored remote pointer, the data element, and the update operation to the available node based on the determined RDMA operation being the update operation;

program instructions to send the stored remote pointer and the determined RDMA operation to the available node based on the determined RDMA operation being the read operation or the delete operation; and wherein the available node performs the sent RDMA operation, wherein the available node forwards the sent RDMA operation to the secondary node if the available node is the primary node and the sent RDMA operation is the insert operation, the update operation, or the delete operation, and wherein the primary node forwards the sent RDMA operation to the secondary node using a bump-in-the-wire field-programmable gate array (FPGA) module in a network adapter associated with the primary node forwarding the sent RDMA operation to the secondary node before the sent RDMA operation is forwarded to software running on the primary node.

16. The computer program product of claim 15, wherein the remote pointer comprises a starting memory address associated with the memory range and an access key.

17. The computer program product of claim 16, wherein the available node performs the sent RDMA operation if the available node is sent the remote pointer and the access key associated with the remote pointer matches a local access key stored on the available node.

18. The computer program product of claim 15, wherein the program instructions to determine the available node comprises using at least one of a heartbeat mechanism and a query.

19. The computer program product of claim 15, wherein the primary node has a primary memory manager and a primary memory region mapped to the memory range and wherein the secondary node has a secondary memory manager and a secondary memory region mapped to the memory range.

* * * * *